UNITED STATES PATENT OFFICE.

ROMOLO BURATTI, OF CROCE MOSSO, ITALY.

CHLORINE DERIVATIVES OF HEXAMETHYLENTETRAMINE.

1,416,606. Specification of Letters Patent. Patented May 16, 1922.

No Drawing. Application filed June 18, 1918. Serial No. 240,700.

(GRANTED UNDER THE PROVISIONS OF THE ACT OF MARCH 3, 1921, 41 STAT. L., 1313.)

*To all whom it may concern:*

Be it known that I, ROMOLO BURATTI, industrial chemist, a subject of the King of Italy, and residing at Croce Mosso, Province of Novara, in the Kingdom of Italy, have invented certain Chlorine Derivatives of Hexamethylentetramine, of which the following is a specification.

The present invention refers to the fabrication of organic compounds obtained by the combination of ammonia, ammonium salts and formaldehyde, with the hypochlorites of the alkaline and alkaline-earth metals.

When to a solution of sodium hypochlorite a convenient organic acid is added, or a weak mineral acid, until the solution is completely neutralized, and then while conveniently cooling the liquid, a convenient solution of hexamethylentetramine is added in a determined quantity by any suitable means, the chlorine of the hypochlorite reacts on same causing a condensation, which originates polychlorated organic bases which are mono di-, tri-, tetra-chloraminic, according to the manner of conducting the operation and the molecular proportions of the reacting substances.

By uniting to the basic compound thus obtained a convenient acid group, an acid derivative is obtained which by salification gives the corresponding salts.

*Example.*—First a solution of hexamethylentetramine is prepared by adding slowly, to 180 grammes of a 40% solution of formaldehyde, 150 grammes of an 18% solution of ammonia; thus the known reaction takes place $$6CH_2O + 4NH_3 = C_6H_{12}N_4 + 6H_2O.$$

Then 520 grammes of sodium hypochlorite containing 10% of active chlorine are neutralized by adding directly and little by little, 52 grammes of crystallized boric acid, until a neutral reaction is obtained with the phenolphthalein test. To the said solution are added very cautiously, in a closed vessel provided with stirring means and a coil wherein a current of cold water is kept circulating, 84 grammes of the aforesaid solution of hexamethylentetramine.

Then the compound hexamethylentetrachloramine is formed and the intervening reaction may be expressed as follows:

$$C_6H_8(NH)_4 + 4HClO = C_6H_8(NCl)_4 + 4H_2O.$$

Claims—

1. A process for the production of stable chlorine derivatives of hexamethylentetramine consisting in neutralizing by an acid, a solution of a hypochlorite of one of those metals classified in the two first metal groups, and in adding to said neutralized solution a solution of hexamethylentetramine.

2. A process of producing stable chlorine derivatives of hexamethylentetramine, consisting in dropping a solution of this latter in a neutralized solution of a salt of the hypochlorous acid, the metal being one of those classified in the two first metal groups, and in stirring continuously the mixture which is kept at the normal room temperature by any cooling means.

3. A process for the production of stable chlorine derivatives of hexamethylentetramine, consisting in neutralizing sodium hypochlorite containing substantially 10% of active chlorine by adding directly and slowly crystallized boric acid, until a neutral reaction is obtained with a phenolphthalein test, adding to said solution, while simultaneously stirring and cooling the same, a solution of hexamethylentetramine, whereby to produce hexamethylentetramine.

In testimony whereof I have signed my name to this specification.

BURATTI ROMOLO.

Witnesses:
AFFRA PIETRO,
GIUSEPPE DE LEO.